United States Patent
Heil

(10) Patent No.: US 6,513,821 B1
(45) Date of Patent: Feb. 4, 2003

(54) COINJECTED POLYMERIC VEHICULAR RUNNING BOARD

(75) Inventor: Philip J. Heil, Harrow (CA)

(73) Assignee: Ventra Group, Inc., Rochester Hills, MI (US)

( * ) Notice: Subject to any disclaimer, the term of this patent is extended or adjusted under 35 U.S.C. 154(b) by 0 days.

(21) Appl. No.: 09/640,764

(22) Filed: Aug. 18, 2000

(51) Int. Cl.⁷ .................................................. B60R 3/00
(52) U.S. Cl. .......................... 280/169; 280/163; 52/177; 182/228.2; 296/75
(58) Field of Search ............................... 280/163, 164.1, 280/169, 291; 52/182, 188, 177; 105/443; 182/82, 90, 127, 228.2; 296/75; 264/259, 260; 428/35.7

(56) References Cited

U.S. PATENT DOCUMENTS

| | | | | |
|---|---|---|---|---|
| 1,584,573 A | * | 5/1926 | Stonehill | 280/169 |
| 1,625,187 A | * | 4/1927 | Birch | 280/169 |
| 1,660,307 A | * | 2/1928 | Bronson | 280/169 |
| 3,903,343 A | | 9/1975 | Pfaff | 428/168 |
| 4,051,290 A | | 9/1977 | Jutte et al. | 428/168 |
| 5,120,082 A | * | 6/1992 | Ito | 280/851 |
| 5,286,049 A | * | 2/1994 | Khan | 280/163 |
| 5,308,570 A | * | 5/1994 | Hara et al. | 264/259 |
| 5,382,035 A | * | 1/1995 | Waddington et al. | 280/169 |
| 5,478,627 A | | 12/1995 | Hara et al. | 428/156 |
| 5,713,589 A | * | 2/1998 | Delgado et al. | 280/163 |
| 5,899,500 A | | 5/1999 | Benvenuto | 280/851 |
| 6,164,439 A | * | 12/2000 | Stebnicki et al. | 198/853 |
| 6,173,979 B1 | * | 1/2001 | Bernard | 280/163 |
| 6,194,043 B1 | * | 2/2001 | Fehn | 428/35.7 |
| 6,270,106 B1 | * | 8/2001 | Maki et al. | 280/163 X |

\* cited by examiner

Primary Examiner—F. Zeender
(74) Attorney, Agent, or Firm—Dykema Gossett PLLC

(57) ABSTRACT

A high strength polymeric injection molded running board for an automotive vehicle is provided including a longitudinal base portion with an upper first surface and a lower second surface opposite the first surface, the upper surface supporting a foot of a vehicle occupant entering or exiting the vehicle. The running board also includes grip ridges integrally molded with the base portion on the first surface to increase the frictional interface between the first surface and the foot of the vehicle occupant entering or exiting the vehicle. The grip ridges have a crown region and an incline portion connecting the crown region with the first surface. The running board also includes reinforcing ribs for strengthening the base portion, the ribs extend from the base portion second surface and are joined to the second surface generally opposite the incline portion of the grip ridges.

7 Claims, 2 Drawing Sheets

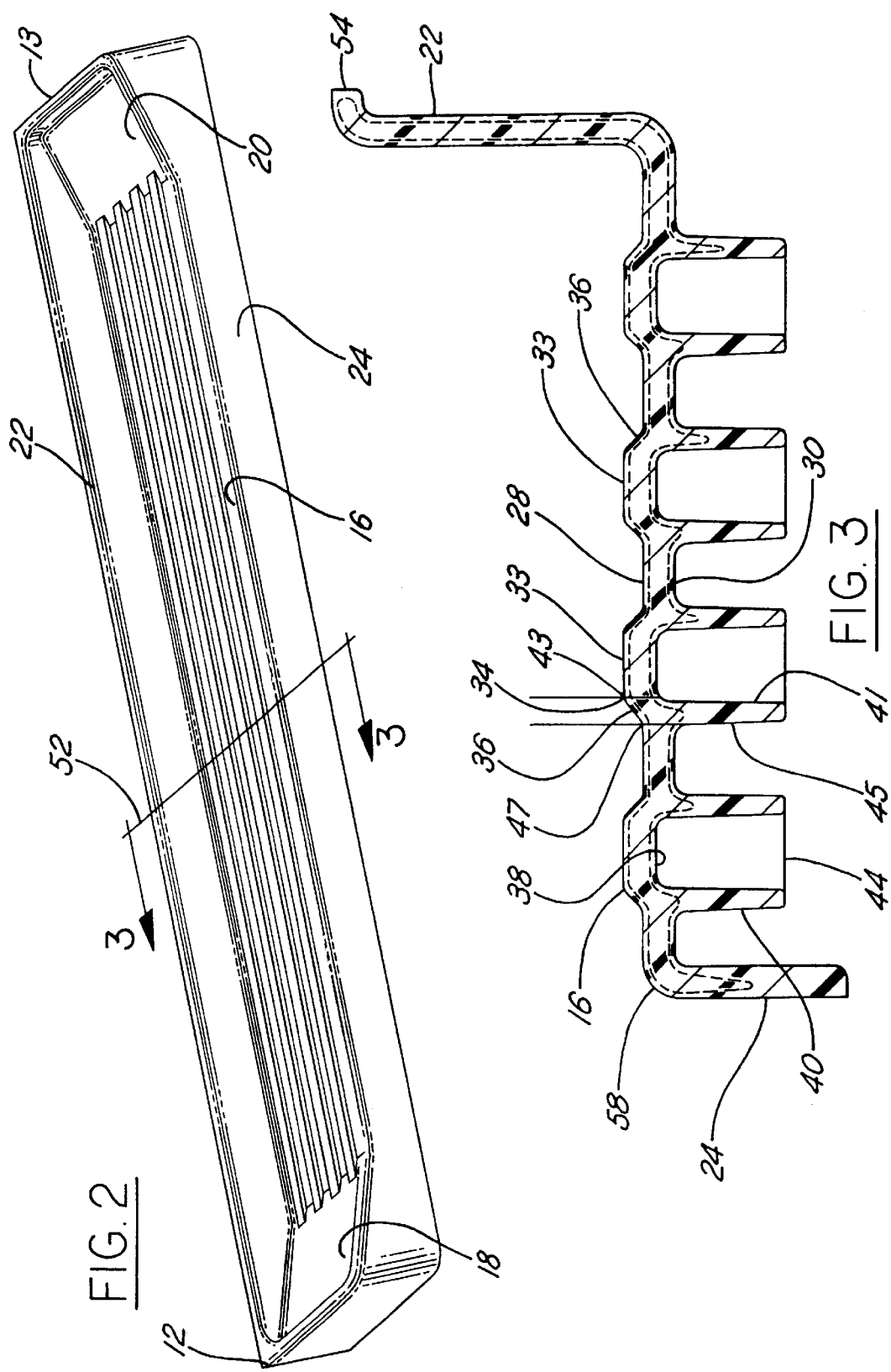

COINJECTED POLYMERIC VEHICULAR RUNNING BOARD

FIELD OF THE INVENTION

The present invention is directed toward a running board for use with motor vehicles, and more particularly toward an improved running board and a method of manufacture thereof utilizing a bi-molded injection technique.

BACKGROUND OF THE INVENTION

Sport utility vehicles, pick-up trucks, and vans often have an appreciable height differential between the cab or passenger compartment and the ground level. Because of this differential, many individuals have difficulty entering and exiting these types of vehicles. Therefore, running boards are mounted alongside the vehicle frame below the door openings to provide a convenient step for individuals to utilize when entering and exiting the vehicle.

In order to support the weight of vehicle occupants stepping or standing on a running board, running boards are commonly formed of metal and plastic and are rigidly secured to the vehicle frame. That is, structural rigidity is an important consideration in the selection of materials for running board construction. Although the u se of such materials is reasonably effective to withstand the repeated loadings associated with frequent entry into and out of vehicles, a number of significant problems exist.

During operation of a vehicle, running boards are continuously exposed to a rather abusive outdoor environment. Consequently, the running board step surface tends to accumulate rainwater, ice, snow, mud, road salt, cinders, and various other materials. These type of materials are very corrosive to metal running boards. Additionally, metal running boards can dent and the coating on metal running boards can easily chip off. The above-noted factors have brought about the use of injection molded polymeric plastic running boards.

Plastic running boards provide several advantages in that they do not corrode. Plastic running boards tend to be lighter and more dent resistant. A material often used is a thermoplastic material such as glass-filled polypropylene resin.

Plastic running boards, however, do have some disadvantages. Most glass-filled plastics such as polypropylene, do not provide an aesthetically pleasing appearance. If it is desired for the plastic running board to have a colored surface which is coordinated with the color of the vehicle body, the plastic running board must be painted. However, due to the repeated foot traffic to which a running board is subjected, the surface of the running board can become scuffed and the paint can become scraped and chipped. Another aesthetic problem associated with the utilization of plastic molded running boards is that the plastic running board must have reinforcing ribs on its undersurface. The position of the ribs on the running board will unfortunately often cause sink marks to become apparent on the step surface of the running board. These marks are aesthetically unpleasing.

It would be highly desirable to provide a plastic running board wherein the color of the running board may be achieved during the molding operation. Additionally, it is desirable to provide a plastic running board wherein the sink marks caused by the underside ribs are reduced or eliminated.

SUMMARY OF THE INVENTION

To fulfill the above-noted desires, the revelation of the present invention is made manifest. In a preferred embodiment, the present invention brings forth a high strength co-injected molded running board for an automotive vehicle. The running board has a longitudinal base portion with an upper first surface and an opposite lower second surface. The first surface of the running board supports the foot of a vehicle occupant entering or exiting the vehicle. The first surface of the running board also has longitudinal grip ridges integrally molded therein. The grip ridges have a crown region and incline portions joining the crown region to the other portions of the first surface. Reinforcing ribs for strengthening the base portion are provided. The reinforcing ribs intersect with the base portion along the second surface generally opposite the incline portion of the grip ridges. Joining the ribs to this portion of the base allows for any sink marks which would typically be caused Bus by the ribs to be either disguised or eliminated.

The mold for the plastic running board is initially injected with a thermoplastic olefin plastic resin or similar material which provides flexibility and an aesthetically pleasing surface which can be color coordinated or painted to match with the vehicle body or it can be brought forth in another desired color. A second injection of glass-filled polypropylene plastic resin or similar substance as a core material is utilized to provide the running board with the required strength.

It is a feature of the present invention to provide a polymeric co-injected plastic running board. It is a feature of the present invention to provide a plastic running board having reinforcing ribs that eliminate or diminish the evidence of sink marks in the opposite support surface.

The above-noted and other features of the present invention will become apparent to those skilled in the art from a review of the invention as it is provided in the accompanying drawings and detailed description of the preferred embodiment.

BRIEF DESCRIPTION OF THE DRAWINGS

FIG. 2 is a perspective view of the running board shown in FIG. 1.

FIG. 3 is a sectional view taken along line 3—3 of FIG. 2.

DETAILED DESCRIPTION OF THE PREFERRED EMBODIMENT

Figure 1:
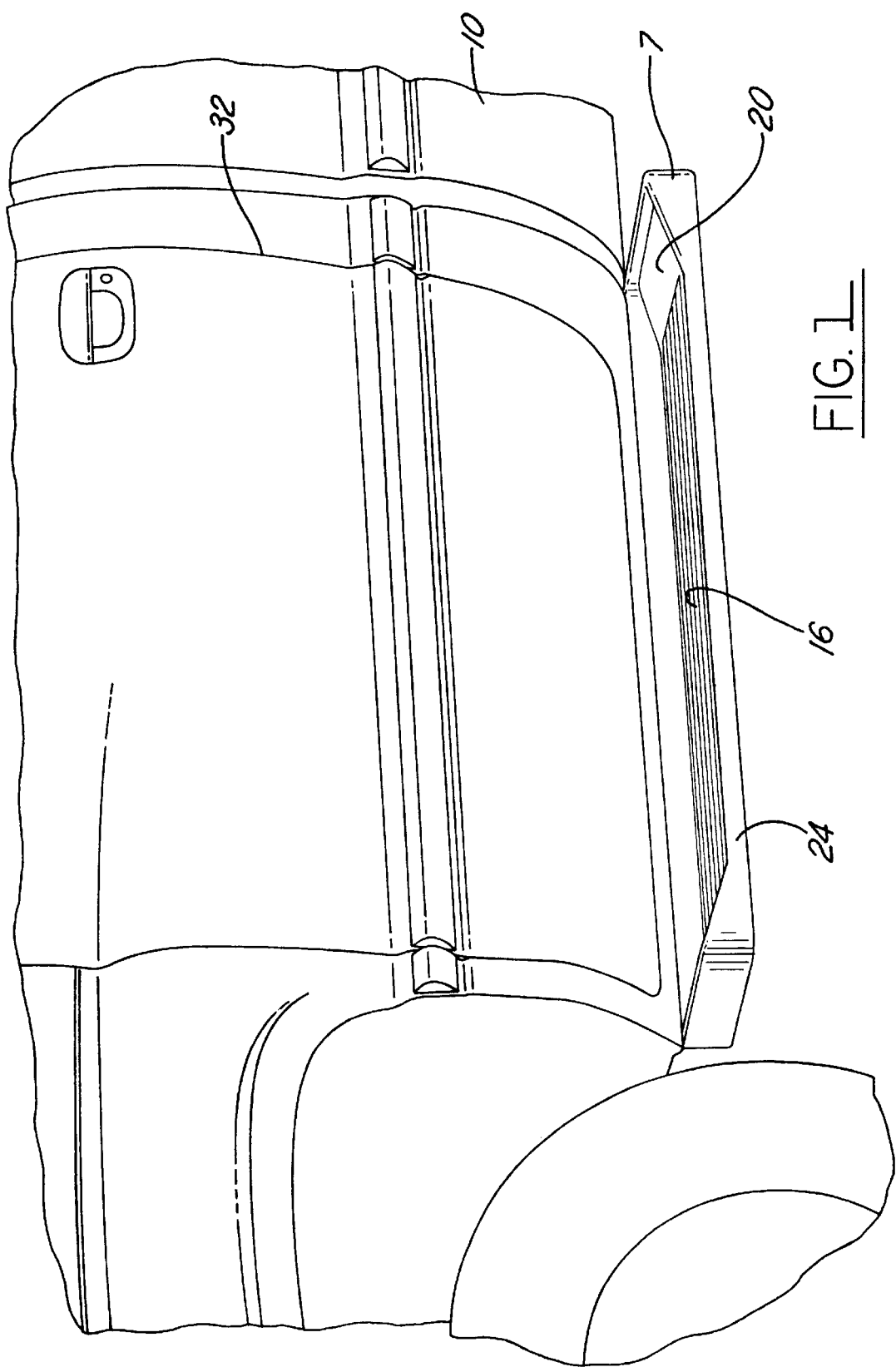
FIG. 1 is a perspective view of a running board according to the present invention installed on a vehicle.

FIG. 1 illustrates the high strength polymeric injection molded running board of the present invention utilized on a light truck automotive vehicle 10. The running board 7 is fixably connected on bracket supports (not shown) that are fixably connected to the frame of the automotive vehicle 10. The running board 7 is connected to the bracket supports by nut inserts or similar (not shown) molded into the running board.

Referring additionally to FIGS. 2 and 3, the running board 7 has a front end 12 and an essentially identical rear end 13. Between the front end 12 and the rear end 13 is a longitudinal base portion 16. The longitudinal base portion 16 is integrally connected with a front side ramp 18 and a rear side ramp 20. Bordering the side ramps 18 and 20 and the longitudinal base portion 16 is an upper skirt 22. In the front of the running board, a front lower skirt 24 extends vertically down on the longitudinal base portion 16 and generally blends into the upper skirt 22.

The longitudinal base portion 16 has an upper first surface 28. Opposite the first surface 28 of the longitudinal base portion is a lower second surface 30. The upper first surface 28 is provided for supporting a foot of a vehicle occupant entering or exiting the vehicle 10 via the vehicle door 32.

Integrally molded on said longitudinal base portion first surface 28 are a series of grip ridges 34. The grip ridges 34 run generally longitudinal along the base portion 16. The grip ridges 34 are provided to increase the frictional interface between the first surface 28 and the foot of the vehicle occupant entering or exiting the vehicle. The grip ridges 34 have a crown region 33. The grip ridges 34 also have an incline portion 36. The incline portion 36 connects the crown region with the remainder of the first surface 28.

To strengthen the base portion 16, a series of reinforcing ribs 40 is provided. The majority of the reinforcing ribs is longitudinally oriented. The ribs 40 are joined to the second surface 30 generally opposite the incline portion 36 of the grip ridges 34. If required, there may be some transversely oriented ribs 44 between some of the longitudinal ribs 40.

In the embodiment of the present invention shown in FIGS. 1–3, the crown region 33 generally corresponds to a matching valley 38 in the second surface 30. As shown in FIG. 3 the crown region is generally flat, however it will be apparent to those skilled in the art that the crown region 33 can also be curved or semi-oval if desired. As stated, the ribs 40 are joined to the second surface generally opposite the incline portion 36 of the grip ridges 34. Each rib 40 has a first side 41 projecting adjacent to an intersection 43 of the crown region 33 and a given incline portion 36. Additionally, each rib has a second side 45 projecting adjacent to an intersection 47 of the same given incline portion 36 with the first surface 28 of the base portion 16. Because of this, any shrinkage which may be caused by the ribs 40 tends to be compensated for or disguised due to the incline of the incline portions 36. Accordingly, the running board of the present invention has a far more aesthetically pleasing appearance than the prior polymeric running boards.

The running board 7 is manufactured in an injection process. The gate of the mold which is utilized in fabricating the running board 7 typically is at the center line 52 of the running board along an edge 54 of the upper skirt 22. A shot of thermoplastic polyolefin (TPO) plastic or other suitable alternative is injected to form the skin 58 of the running board 7. The TPO shot will form a skin or shell of 1.5 millimeters thickness which provides excellent durability, weatherability, paintably and appearance which is attractive to the vehicle occupant. A second shot of core material comprised of glass-filled polypropylene (GFPP) or similar will be injected into the mold. The glass-filled polypropylene core provides structure, rigidity and low thermal expansion properties.

The present inventive plastic running board has been shown in a preferred embodiment. However, it will be apparent to those skilled in the art that various modifications can be made to the present invention without departing from the spirit or scope of the present invention as it is encompassed in the specification and drawings and by the following claims.

We claim:

1. A polymeric injection molded running board for an automotive vehicle comprising:

a longitudinal base portion with an upper first surface and a lower second surface opposite said first surface, said upper surface supporting a foot of a vehicle occupant entering or exiting the vehicle;

longitudinal grip ridges integrally molded with said base portion on said first surface to increase the frictional interface between said first surface and the foot of the vehicle occupant entering or exiting the vehicle, said grip ridges having a crown region and an incline portion connecting said crown region with said first surface, and longitudinal reinforcing ribs for strengthening said base portion, said ribs continuously extending over half of the length of said base portion from said base portion second surface and being joined to said second surface generally opposite said incline portion of said grip ridges, said ribs having a first side projecting adjacent to an intersection of said crown region and a given said incline portion and said ribs second side projecting adjacent to an intersection of said given incline portion with said base portion first surface, and said longitudinal reinforcing ribs being under a single incline portion of said first surface.

2. A polymeric injection molded running board as described in claim 1, wherein said running board is a co-injection molded fabricated part.

3. A polymeric injection molded running board as described in claim 2, wherein a base core material is glass-filled polypropylene and a skin covering material is of thermoplastic polyolefin resin.

4. A polymeric injection molded running board as described in claim 1, wherein said crown region is generally flat.

5. An injection molded running board as described in claim 1, wherein said crown region generally corresponds to a matching valley in said second surface.

6. A bi-injection polymeric running board with a molded glass polymer core base with a co-molded polymer skin covering, which is paintable for an automotive vehicle comprising:

a longitudinal base portion with an upper first surface and a lower second surface opposite said first surface, said upper surface supporting a foot of a vehicle occupant entering or exiting the vehicle;

longitudinal grip ridges integrally molded with said base portion on said first surface to increase the frictional interface between said first surface and the foot of the vehicle occupant entering or exiting the vehicle, said grip ridges having a crown region and an incline portion connecting said crown region with said first surface, said second surface of said base portion having a matching valley generally corresponding to said crown region; and longitudinal reinforcing ribs for strengthening said base portion, said ribs continuously extending over half of the length of said base portion from said base portion second surface and being joined to said second surface generally opposite said incline portion of said grip ridges, said ribs having a first side projecting adjacent to an intersection of said crown region and a given said incline portion and said ribs having a second side projecting adjacent to an intersection of said given incline portion with said base portion first surface, and said longitudinal reinforcing ribs being unde a single incline portion of said first surface.

7. A polymeric injection molded running board as described in claim 6, wherein said core base material is glass-filled polypropylene and a material of said skin covering the core base material is a thermoplastic polyolefin.

* * * * *